US012635044B2

(12) United States Patent
Sikora

(10) Patent No.: US 12,635,044 B2
(45) Date of Patent: *May 19, 2026

(54) VOLTAGE DOUBLING CIRCUIT FOR POWERING A LOAD

(71) Applicant: Tomar Electronics, Inc., Gilbert, AZ (US)

(72) Inventor: Scott T. Sikora, Gilbert, AZ (US)

(73) Assignee: Tomar Electronics, Inc., Gilbert, AZ (US)

( * ) Notice: Subject to any disclaimer, the term of this patent is extended or adjusted under 35 U.S.C. 154(b) by 88 days.

This patent is subject to a terminal disclaimer.

(21) Appl. No.: 18/943,759

(22) Filed: Nov. 11, 2024

(65) Prior Publication Data

US 2025/0113416 A1 Apr. 3, 2025

Related U.S. Application Data

(63) Continuation of application No. 18/478,707, filed on Sep. 29, 2023, now Pat. No. 12,144,073.

(51) Int. Cl.
*H05B 41/32* (2006.01)
*H02M 7/04* (2006.01)

(52) U.S. Cl.
CPC .............. *H05B 41/32* (2013.01); *H02M 7/04* (2013.01)

(58) Field of Classification Search
CPC ................................ H05B 41/32; H02M 7/04
See application file for complete search history.

(56) References Cited

FOREIGN PATENT DOCUMENTS

| CN | 201202575 | | 3/2009 |
|---|---|---|---|
| CN | 103476190 A | * | 12/2013 |
| JP | H05252745 | | 9/1993 |
| JP | 5252745 A | | 7/2013 |

OTHER PUBLICATIONS

Electrical Academia. Author Unknown. "Half-Wave & Full-Wave Voltage Doubler: Working & Circuit Diagram", ElectricalAcademia. com. May 28, 2022 (May 28, 2022. Retrieved on Jan. 19, 2024. 3 pages. Retrieved from <URL: https://web.archive.org/web/20220528071846/https://electricalacademia.com/electronics/half-wave-full-wave-voltage-doubler-working-circuit-diagram/> entire document.

Shepard. "How does a silicon controlled rectifier work?", EEworldOnline >Archives> Semiconductors. Jul. 18, 2022 (Jul. 18, 2022). Retrieved on Jan. 19, 2024. 8 pages. Retrieved from <URL: https://www.ceworldonline.com/how-does-a-silicon-controlled-rectifier-work-faq/> entire document.

NEXT.GR. Author Unknown. "Variable-strobe-light". Xenon Circuits. Mar. 2, 2013 (Mar. 2, 2013). Retrieved on Jan. 19, 2024. 2 pages. Retrieved from <URL: https://www.next.gr/ligh••laser-led/xenon-circuitsNariable-strobe-light-113 726.html> entire docwnenl.

* cited by examiner

*Primary Examiner* — Henry Luong
(74) *Attorney, Agent, or Firm* — Kenneth C. Booth; Booth Udall, PLC

(57) ABSTRACT

A voltage doubling circuit including a silicon controlled rectifier (SCR) having a control circuit configured to charge a charging capacitor during a negative alternating current cycle, and including a storage capacitor that receives a voltage from the charging capacitor during a positive alternating current cycle, and by charging the storage capacitor from the charging capacitor when the SCR is off, the storage capacitor is prevented from exceeding its regulated voltage even if the SCR fails.

18 Claims, 3 Drawing Sheets

1

VOLTAGE DOUBLING CIRCUIT FOR POWERING A LOAD

REFERENCE TO RELATED APPLICATIONS

Related Applications

This application is a continuation of U.S. non-provisional patent application Ser. No. 18/478,707, filed Sep. 29, 2023, titled VOLTAGE DOUBLING CIRCUIT FOR POWER-ING A LOAD" the entirety of the disclosure of which is hereby incorporated by this reference.

TECHNICAL FIELD

The following disclosure relates to electrical circuits, specifically relating to voltage doubling circuits.

BACKGROUND

Voltage doubling circuits have been used to provide a DC output voltage to a capacitor from an AC input voltage where the DC output voltage is greater than that of the AC input voltage. Circuit designs have been proposed that address control of the DC output voltage in order to set the flash intensity of a strobe lamp or to prevent overvoltage of the capacitor, where such overvoltage is a safety concern.

SUMMARY

Aspects of this document relate to a voltage doubling circuit configured for providing power to a strobe light, the circuit comprising a positive terminal and a negative terminal configured to couple across an alternating current voltage source, at least one resistor connected in a parallel configuration with each of at least one non-polar charging capacitor forming a parallel combination, the parallel combination together being connected in series between the positive terminal and the first output terminal, a second output terminal coupled to the negative terminal, a diode connected in series between the parallel combination and the first output terminal and configured to allow the flow of current from the capacitors to the first output terminal, a polar storage capacitor having an anode coupled between the diode and the first output terminal, and a cathode coupled to the negative terminal, a silicon controlled rectifier (SCR) having a cathode coupled between the parallel combination and the diode, and an anode coupled to the negative terminal, and a control circuit having a first connection to the positive terminal, a second connection to the negative terminal, and a third connection to a gate of the SCR, the control circuit configured to switch the SCR between an on state to allow the flow of electricity through the SCR, and an off state to restrict the flow of electricity through the SCR, wherein during a negative half of an AC cycle the control circuit is configured to control the SCR to allow the flow of electricity such that the at least one non-polar charging capacitor is charged to a maximum voltage, and during a positive half of the AC cycle the control circuit is configured to control the SCR to restrict the flow of electricity such that the at least one non-polar charging capacitor discharges through the diode and into the polar storage capacitor, wherein by charging the polar storage capacitor through the SCR, the polar storage capacitor is prevented from being over-voltaged even if the SCR fails, and wherein the first output terminal and the second output terminal are config-ured to provide power to a strobe light.

Particular embodiments may comprise one or more of the following features. The capacitance value of the polar stor-age capacitor may be greater than that of the at least one non-polar charging capacitor, and the capacitance value range of the at least one non-polar charging capacitor is from 0.05 to 0.2 times that of the polar storage capacitor. The control circuit may be configured so that during a negative half of the AC cycle the control circuit activates the SCR to allow or restrict the flow of electricity to the at least one non-polar charging capacitor to charge the polar storage capacitor to a predetermined voltage. A strobe light coupled between the first output terminal and the second output terminal, wherein the strobe light comprises any one of a horticulture luminary light, a noble gas light and a high intensity discharge (HID) light. The strobe light may be a pulsed xenon light. The control circuit may be configured so that during the negative half of the AC cycle, the control circuit activates the SCR to restrict the flow of electricity such that the at least one non-polar charging capacitor is not charged.

Aspects of this document relate to a voltage doubling circuit for providing power to a load, the circuit comprising a first power terminal and a second power terminal config-ured to couple across an alternating current voltage source, at least one charging capacitor coupled in series between the first power terminal and a first output terminal, a second output terminal coupled to the second power terminal, a diode connected in series between the charging capacitor and the first output terminal, and configured to allow the flow of current from the charging capacitor to the first output terminal, a storage capacitor having a first lead coupled between a first node positioned between the diode and the first output terminal, and a second lead coupled to the second power terminal, a silicon controlled rectifier (SCR) having a cathode coupled at a second node between the charging capacitor and the diode, and an anode coupled to the second power terminal, and a control circuit having a first connec-tion to power, a second connection to power, and a third connection to a gate of the SCR, the control circuit config-ured to switch the SCR between an on state to allow the flow of electricity through the SCR, and an off state to restrict the flow of electricity through the SCR, wherein during a negative half of an AC cycle the control circuit is configured to control the SCR to allow the flow of electricity such that the charging capacitor is charged, and during a positive half of the AC cycle the SCR restricts the flow of electricity such that the charging capacitor charges the storage capacitor through the diode, wherein the storage capacitor is pre-vented from being over-voltaged even if the SCR fails.

Particular embodiments may comprise one or more of the following features. The control circuit may be configured so that during a negative half of the AC cycle the control circuit activates the SCR to allow or restrict the flow of electricity to the at least one non-polar charging capacitor to charge the storage capacitor to a predetermined voltage. During a negative half of the AC cycle, the control circuit may configure the SCR to allow the flow of electricity to the at least one charging capacitor to charge it to a maximum voltage. The control circuit may be configured so that during the negative half of the AC cycle, the control circuit acti-vates the SCR to restrict the flow of electricity such that the at least one non-polar charging capacitor is not charged. The capacitance value of the storage capacitor may be greater than that of the at least one charging capacitor, and the capacitance value range of the at least one charging capaci-tor is from 0.05 to 0.2 times that of the storage capacitor. The storage capacitor may be configured to provide power to a load comprising any one of a strobe light, a horticulture luminary light and a high intensity discharge (HID) light. The storage capacitor may be configured to provide power to a strobe light comprising a pulsed xenon light.

Aspects of this document relate to a method of powering a load with a voltage doubling circuit, the method comprising the steps of a) providing a voltage doubling circuit comprising a first power terminal, a first output terminal, a second power terminal and a second output terminal, a charging capacitor coupled in series between the first power terminal and the first output terminal, a diode coupled in series between the charging capacitor and the first output terminal, a storage capacitor having a first lead coupled at a first node between the diode and the first output terminal, and a second lead coupled to the second power terminal, and a silicon controlled rectifier (SCR) having a cathode coupled at a second node between the charging capacitor and the diode, and an anode coupled to the second power terminal, b) coupling the first power terminal and the second power terminal across an alternating current voltage source having an input voltage, and c) controlling the SCR with a control circuit to allow the flow of electricity through the SCR to the charging capacitor during a negative half of an AC cycle of the alternating current voltage source, wherein flow of electricity through the SCR during the positive half of the AC cycle is restricted such that the charging capacitor discharges into the storage capacitor, and wherein the storage capacitor is charged to a voltage up to twice the peak input voltage to power a load placed across the first output terminal and the second output terminal.

Particular embodiments may comprise one or more of the following features. During the negative half of the AC cycle, the alternating current voltage source may charge the charging capacitor to a voltage of the alternating current voltage source. A voltage of the storage capacitor may be regulated by during a negative half of the AC cycle, the control circuit configures the SCR to allow or restrict the flow of electricity from the charging capacitor to charge the storage capacitor to a predetermined voltage during the positive half of the AC cycle. Placing a load across the first output terminal and the second output terminal, wherein the load comprises any one of a strobe light, a horticulture luminary light, a pulsed xenon light and a high intensity discharge (HID) light. The storage capacitor may be configured to provide power to a strobe light comprising a pulsed xenon light.

The foregoing and other aspects, features, and advantages will be apparent to those of ordinary skill in the art from the DESCRIPTION and DRAWINGS, and from the CLAIMS.

BRIEF DESCRIPTION OF THE DRAWINGS

Implementations will hereinafter be described in conjunction with the appended and/or included DRAWINGS, where like designations denote like elements, and.

DETAILED DESCRIPTION

Figure 1:
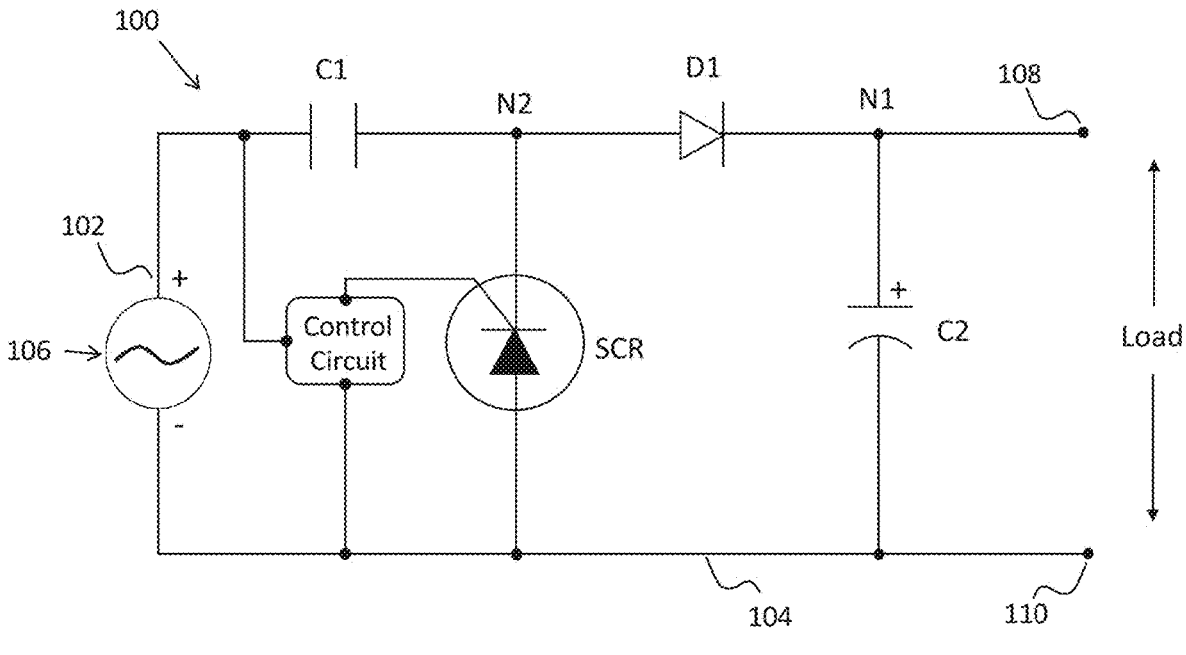
FIG. 1 is a representation of an exemplary voltage doubling circuit for providing power to a load according to embodiments as disclosed herein.

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented but have been omitted for purposes of brevity.

When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Figure 2:
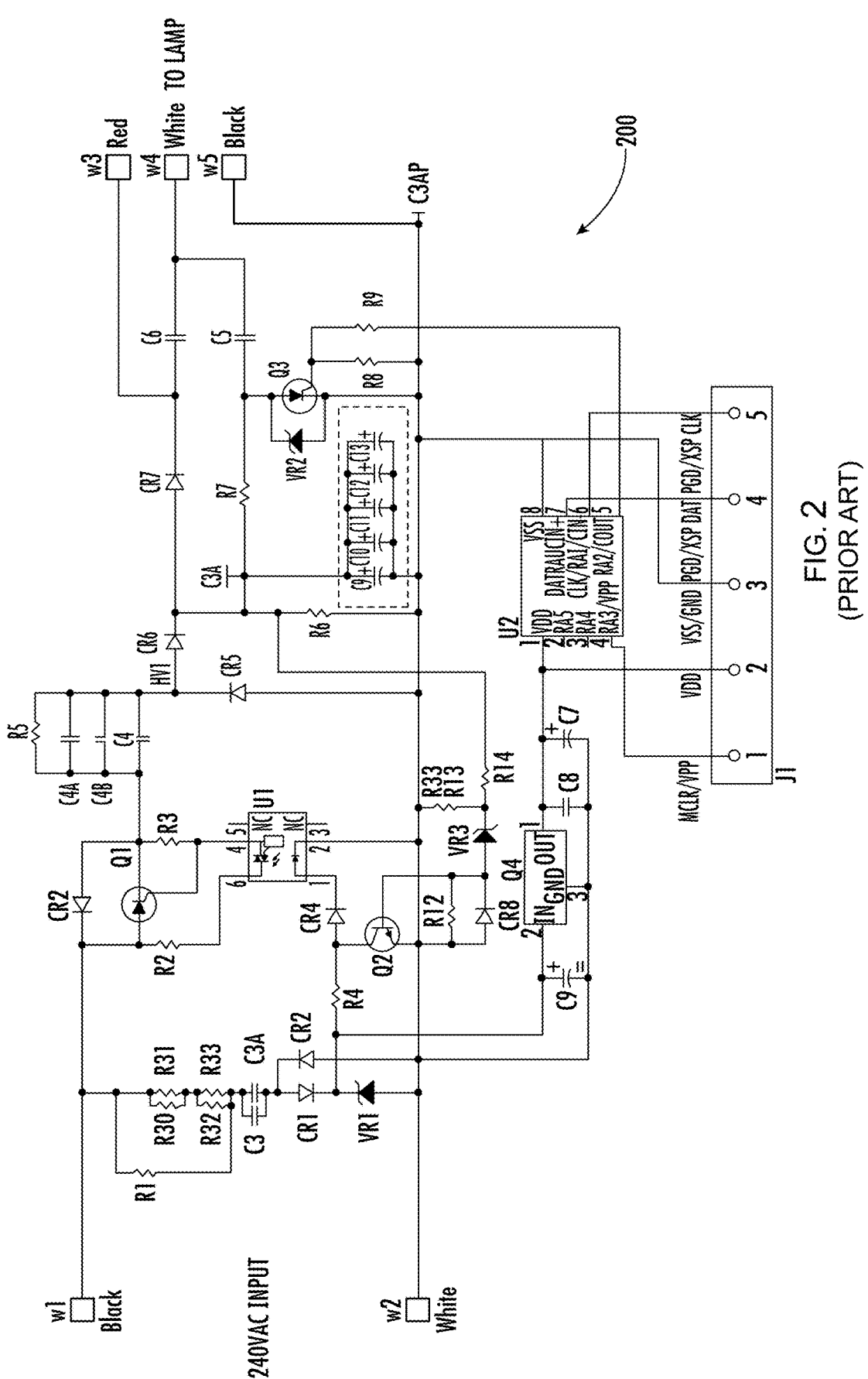
FIG. 2 is a representation of a conventional voltage doubling circuit for providing power to a load.
Figure 3:
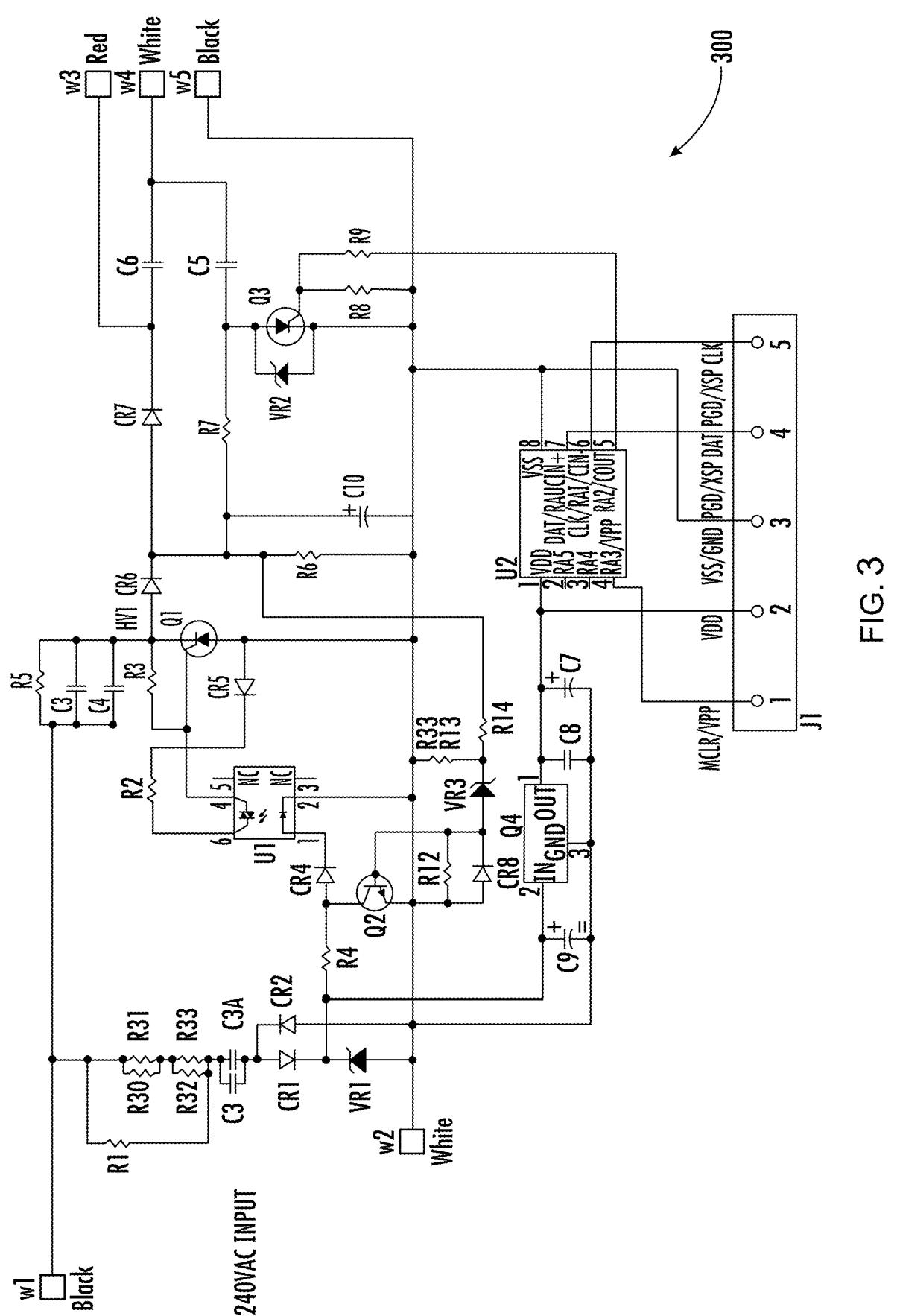
FIG. 3 is a representation of a voltage doubling circuit for providing power to a load according to alternate embodiments as disclosed herein.

Particular implementations of a voltage doubling circuit include various elements and are illustrated as non-limiting examples in FIGS. 1-3. Referring specifically to FIG. 1, an implementation of a voltage doubling circuit 100 is depicted. The voltage doubling circuit 100 of FIG. 1 includes a first power terminal 102 and a second power terminal 104 configured to couple across an alternating current (AC) voltage source 106. The voltage source may be 120 VAC, 240 VAC and up to and including any voltage needed.

As depicted in FIG. 1, the voltage doubling circuit 100 may include at least one charging capacitor, C1, or other equivalent circuit like a synthetic non-polar capacitor formed by using two polar capacitors with diodes controlling current flow through them to avoid a reverse voltage situation connected in series between the AC voltage source 106, at a first power terminal 102, or positive terminal, and a first output terminal 108. In some embodiments, the charging capacitor C1 may be a non-polar capacitor. The charging capacitor C1 circuit may additionally include other components, such one or more bleeder resistors for safety and/or one or more additional capacitors connected in parallel with each other between the AC voltage source 106 and the first output terminal 108, as needed for a particular implementation, but these additional components are not necessary for the most simplified version of the circuit to work as intended (see, for example, the more complex circuit of FIG. 3).

A diode, D1, may be connected in series between the charging capacitor C1 and the first output terminal 108 such that an anode of the diode is connected toward the capacitor C1, and a cathode of the diode is connected toward the first output terminal 108 and the diode is configured to allow the flow of current from the charging capacitor C1 toward the first output terminal 108. More complex embodiments of this portion of the circuit may be configured with additional components, for example, as illustrated in FIGS. 2 and 3.

The voltage doubling circuit 100 includes a storage capacitor C2 for storing a charge to power a load, the storage capacitor C2 having an anode coupled at N1 between the diode D1 and first output terminal 108, and a cathode coupled to the second power terminal 104, or negative terminal. In particular embodiments, the storage capacitor C2 is a polar capacitor.

Storage capacitor C2 may have a capacitance value greater than the capacitance value of charging capacitor C1. For example, depending upon the specific circuit design used, storage capacitor C2 would, for many situations have a capacitance value of from 5 uF to 1000 uF, but the specific values within this range or outside of it is determined by the circuit into which it is used and has no specific limit, and in particular embodiments charging capacitor C1 would, for many situations, have a capacitance value of from 0.1 uF to 20 uF depending upon how fast the designer intends for storage capacitor C2 to charge. The charge stored in charging capacitor C1 stored during the negative half of the charging cycle with the AC input is transferred to storage capacitor C2 during the positive half of the cycle. For storage capacitor C2 to reach a predetermined voltage within a predetermined duration determines the value of storage capacitor C2.

The SCR controller controls charging during the negative half cycle. If it is desired to charge the storage capacitor C2, the controller turns on the SCR during the negative half cycle so that the charge on the charging capacitor C1 is transferred to the storage capacitor C2 on the next positive half cycle. If it is desired to not charge the storage capacitor C2 on a particular cycle, the SCR is maintained off during the preceeding negative half cycle so there is no charge to transfer to the storage capacitor C2 from the charging capacitor C1 on the next positive half cycle. This additionally ensures that if there is an open, or short failure of the SCR leads to no charging of the storage capacitor C2.

Still referring to FIG. 1, the voltage doubling circuit 100 further includes a silicon controlled rectifier (SCR), which may also be a type of thyristor as these terms are often used interchangeably by those skilled in the art. The SCR may have a cathode coupled to node N2 between the charging capacitor C1 and the diode D1, and an anode coupled to terminal 104. The voltage doubling circuit 100 also comprises a control circuit configured to control current through the SCR, having a first connection between the AC voltage source 106 and charging capacitor C1, a second connection to the second power terminal 104, and a third connection to a gate of the SCR. The control circuit may be configured to switch the SCR between an on state to allow the flow of electricity through the SCR, and an off state to stop, or restrict, the flow of electricity through the SCR.

In operation of one particular embodiment, during a negative half of an AC cycle, the control circuit is configured to control the SCR to allow the flow of electricity to the charging capacitor C1 such that the charging capacitor C1 may be charged to its maximum voltage. In an alternate embodiment, during the negative half of the AC cycle, the control circuit is configured to control the SCR to regulate the flow of electricity to the charging capacitor C1 such that the voltage of the storage capacitor C2 does not exceed a maximum voltage of the storage capacitor C2. As one non limiting example of a maximum voltage, the maximum voltage of storage capacitor C2 may be twice the input voltage of the AC voltage source 106. In an additional embodiment, during the negative half of the AC cycle, the control circuit may be configured to control the SCR to charge the charging capacitor C1 to a predetermined voltage (i.e., setting a particular voltage to charge C1). In yet an additional embodiment, during the negative half of the AC cycle, the control circuit may be configured to control the SCR to restrict the flow of electricity through the SCR such that the charging capacitor C1 is not charged and no current flows into the storage capacitor C2 during the positive AC cycle. In each of the above embodiments, control of the charging of capacitor C1, and thereby the regulated charging of storage capacitor C2, is accomplished by switching the SCR during the negative half of the AC cycle between an on state to allow the flow of electricity through the SCR, and an off state to restrict the flow of electricity through the SCR.

For a particular embodiment, during a positive half of the AC cycle, due to the nature of an SCR acting like a diode when reversed biased, electricity flow is restricted through the SCR such that the charging capacitor C1 discharges through the diode D1 and into the storage capacitor C2. In addition, during the positive half of the AC cycle, the AC voltage source charges the charging capacitor C1 through diode D1 and into storage capacitor C2. Thus, the charging capacitor C1 is charged during both positive and negative AC cycles and discharged into storage capacitor C2 during the positive half of the AC cycle.

The circuit topology disclosed herein may be useful for any application using voltage doubler circuitry. The disclosed circuit topology, which replaces the typical diode from a voltage doubler circuit with the SCR, prevents failure (for example by a short circuit) of the SCR from exposing the storage capacitor C2 to voltages that meet or exceed a voltage rating of storage capacitor C2, thereby providing a voltage doubling circuit having enhanced safety. In this way, no failure of the SCR can cause overvoltage of storage capacitor C2 and no specialized control of the SCR is required to provide the protection from overvoltage of storage capacitor C2. The protection from overvoltage of C2 provided by the disclosed voltage doubler circuitry becomes particularly important when twice the input voltage exceeds the voltage rating of storage capacitor C2. Capacitor voltage ratings are commonly known in the art and may readily be determined by consulting the supplier or manufacturer. As used herein, the term "maximum voltage" means the voltage rating of a capacitor.

FIG. 2 illustrates a conventional voltage doubling circuit that suffers from the problem that when the SCR Q1 is fail shorted, capacitor C9 results in an overvoltage that is unsafe. FIG. 3 each depicts a more complex, alternate embodiment of the simply embodied circuit of FIG. 1. The conventional circuit design of FIG. 2 illustrates a 240 VAC voltage doubling circuit 200 which includes an SCR (labeled as Q1) that is connected in series with the charging path. When the SCR is in an on state, allowing the flow of electricity, the voltage doubling circuit charges the capacitors (C9-C13). In this configuration, however, if SCR Q1 fail shorts, that failure destructively overvoltages storage any or all of capacitors C9-C13. The new circuit of FIG. 1 can be used to overcome this failure problem.

FIG. 3 depicts voltage doubling circuit 300 which includes two charging capacitors C3 and C4 coupled in parallel with resistor R5. The voltage doubling circuit 300 may be used in 120 VAC or 240 VAC applications. The voltage doubling circuit 300 incorporates the basic voltage doubling circuit 100 of FIG. 1 as described above into a more complex circuit, and further discloses capacitor and resistor combinations compatible with the 120V version and the 240V version of voltage doubling circuit 300. Voltage doubling circuit 300 may be configured to power a strobe light, and in particular embodiments, a xenon strobe light useful in a horticulture luminary.

Referring to FIG. 1 as exemplary, a load may be placed across the first output terminal 108 and a second output terminal 110. The load may comprise any type of load, without limitation, which may be powered by capacitor C2.

In embodiments in accordance with any of FIGS. 1 to 3, the load may comprise an AC powered capacitor charge/discharge strobe light, a horticulture luminary, or a high intensity discharge (HID) light. The load may comprise a pulsed xenon horticulture luminary. The load may further comprise a HID light having a bulb comprising a noble gas, a metal halide or high pressure sodium. In particular embodiments according to FIG. 3, the load may comprise an AC powered capacitor charge/discharge horticulture luminary comprising pulsed xenon.

Disclosed herein is a method of powering a load using a voltage doubling circuit according to any of the above-described voltage doubling circuits according to FIGS. 1 to 3. The method of powering a load with a voltage doubling circuit may include the steps of a) providing a voltage doubling circuit comprising a first power terminal, a first output terminal, a second power terminal and a second output terminal; a first capacitor coupled between the first power terminal and the first output terminal, a diode coupled in series between the first capacitor and the first output terminal, a storage capacitor having an anode coupled between the diode and the first output terminal and a cathode coupled to the second power terminal, and a silicon controlled rectifier (SCR) having a cathode coupled between the non-polar capacitor and the diode, and an anode coupled to the second power terminal. As part of the method, b) coupling the first power terminal and the second power terminal across an alternating current voltage source having an input voltage, and c) controlling the SCR with a control circuit to allow the flow of electricity through the SCR to the non-polar capacitors during a negative half of an AC cycle of the alternating current voltage source, and to restrict the flow of electricity through the SCR during the positive half of the AC cycle such that the non-polar charging capacitors discharge into the storage capacitor, and the storage capacitor is charged to a voltage up to two times the peak input voltage to power a load placed across the first output terminal and the second output terminal.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

It will be understood that implementations of the voltage doubling circuit for powering a load include but are not limited to the specific components disclosed herein, as virtually any components consistent with the intended operation of various voltage doubling circuits for powering a load may be utilized. Accordingly, for example, it should be understood that, while the drawings and accompanying text show and describe particular voltage doubling circuit for powering a load implementations, any such implementation may comprise any shape, size, style, type, model, version, class, grade, measurement, concentration, material, weight, quantity, and/or the like consistent with the intended operation of voltage doubling circuits for powering a load.

The concepts disclosed herein are not limited to the specific voltage doubling circuit for powering a load shown herein. For example, it is specifically contemplated that the components included in particular voltage doubling circuits for powering a load may be formed of any of many different types of materials or combinations that can readily be formed into shaped objects and that are consistent with the intended operation of the voltage doubling circuit for powering a load. For example, the components may be formed of: rubbers (synthetic and/or natural) and/or other like materials; glasses (such as fiberglass), carbon-fiber, aramid-fiber, any combination therefore, and/or other like materials; elastomers and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials; plastics and/or other like materials; composites and/or other like materials; metals, such as zinc, magnesium, titanium, copper, iron, steel, carbon steel, alloy steel, tool steel, stainless steel, spring steel, aluminum, and/or other like materials; and/or any combination of the foregoing.

Furthermore, the voltage doubling circuit for powering a load may be manufactured separately and then assembled together, or any or all of the components may be manufactured simultaneously and integrally joined with one another. Manufacture of these components separately or simultaneously, as understood by those of ordinary skill in the art, may involve 3-D printing, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular voltage doubling circuits for powering a load implementations, it should be readily apparent that a number of modifications may be made without departing from the spirit thereof and that these implementations may be applied to other implementations disclosed or undisclosed. The presently disclosed voltage doubling circuit for powering a load is, therefore, to be considered in all respects as illustrative and not restrictive.

Many additional implementations are possible. Further implementations contemplated are within the scope of the CLAIMS below.

I claim:

1. A voltage doubling circuit for providing power to a load, the circuit comprising:
   a positive terminal and a negative terminal configured to couple across an alternating current voltage source;
   a non-polar charging capacitor connected in series between the positive terminal and a first output terminal;
   a second output terminal coupled to the negative terminal;
   a diode connected in series between the non-polar charging capacitor and the first output terminal and configured to allow the flow of current from the non-polar charging capacitor to the first output terminal;
   a polar storage capacitor having an anode coupled between the diode and the first output terminal, and a cathode coupled to the negative terminal;
   a silicon controlled rectifier (SCR) having a cathode coupled between the non-polar charging capacitor and the diode, and an anode coupled to the negative terminal; and
   a control circuit configured to switch the SCR between an on state to allow the flow of electricity through the SCR, and an off state to restrict the flow of electricity through the SCR,
   wherein during a negative half of an AC cycle the control circuit is configured to control the SCR to allow the flow of electricity, and during a positive half of the AC cycle the control circuit is configured to control the SCR to restrict the flow of electricity, and
   wherein by charging the polar storage capacitor through the SCR, the polar storage capacitor is prevented from being over-voltaged even if the SCR fails.

2. The voltage doubling circuit of claim 1, wherein the capacitance value of the polar storage capacitor is greater than that of the at least one non-polar charging capacitor, and the capacitance value range of the at least one non-polar charging capacitor is from 0.05 to 0.2 times that of the polar storage capacitor.

3. The voltage doubling circuit of claim 1, wherein the control circuit is configured so that during a negative half of the AC cycle the control circuit activates the SCR to allow or restrict the flow of electricity to the at least one non-polar charging capacitor to charge the polar storage capacitor to a predetermined voltage.

4. The voltage doubling circuit of claim 1, further comprising a strobe light coupled between the first output terminal and the second output terminal, wherein the strobe light comprises any one of a horticulture luminary light, a noble gas light and a high intensity discharge (HID) light.

5. The voltage doubling circuit of claim 4, wherein the strobe light comprises a pulsed xenon light.

6. The voltage doubling circuit of claim 1, wherein the control circuit is configured so that during the negative half of the AC cycle, the control circuit activates the SCR to restrict the flow of electricity such that the at least one non-polar charging capacitor is not charged.

7. A voltage doubling circuit for providing power to a load, the circuit comprising:
   a first power terminal and a second power terminal configured to couple across an alternating current voltage source;
   a charging capacitor coupled in series between the first power terminal and a first output terminal;
   a diode connected in series between the charging capacitor and the first output terminal, and configured to allow the flow of current from the charging capacitor to the first output terminal;
   a storage capacitor having a first lead coupled between the diode and the first output terminal, and a second lead coupled to a second power terminal;
   a silicon controlled rectifier (SCR) having a cathode coupled between the charging capacitor and the diode, and an anode coupled to the second power terminal; and
   a control circuit having a first connection to power, a second connection to power, and a third connection to a gate of the SCR,
   wherein during a negative half of an AC cycle the control circuit is configured to control the SCR to allow the flow of electricity such that the charging capacitor is charged, and during a positive half of the AC cycle the SCR restricts the flow of electricity such that the charging capacitor charges the storage capacitor through the diode,
   wherein the storage capacitor is prevented from being over-voltaged even if the SCR fails.

8. The voltage doubling circuit for providing power to a load of claim 7, wherein the control circuit is configured so that during a negative half of the AC cycle the control circuit activates the SCR to allow or restrict the flow of electricity to the at least one non-polar charging capacitor to charge the storage capacitor to a predetermined voltage.

9. The voltage doubling circuit for providing power to a load of claim 7, wherein during a negative half of the AC cycle, the control circuit configures the SCR to allow the flow of electricity to the at least one charging capacitor to charge it to a maximum voltage.

10. The voltage doubling circuit for providing power to a load of claim 7, wherein the control circuit is configured so that during the negative half of the AC cycle, the control circuit activates the SCR to restrict the flow of electricity such that the at least one non-polar charging capacitor is not charged.

11. The voltage doubling circuit for providing power to a load of claim 7, wherein the capacitance value of the storage capacitor is greater than that of the at least one charging capacitor, and the capacitance value range of the at least one charging capacitor is from 0.05 to 0.2 times that of the storage capacitor.

12. The voltage doubling circuit for providing power to a load of claim 7, wherein the storage capacitor is configured to provide power to a load comprising any one of a strobe light, a horticulture luminary light and a high intensity discharge (HID) light.

13. The voltage doubling circuit for providing power to a load of claim 7, wherein the storage capacitor is configured to provide power to a strobe light comprising a pulsed xenon light.

14. A method of powering a load with a voltage doubling circuit, the method comprising the steps of:
  a) providing a voltage doubling circuit comprising:
    a first and a second power terminal;
    a first and a second output terminal, the second output terminal coupled to the second power terminal;
    a charging capacitor coupled between the first power terminal and the first output terminal;
    a diode coupled in series between the charging capacitor and the first output terminal;
    a storage capacitor having an anode and a cathode, the anode coupled between the diode and the first output terminal and the cathode coupled to the second output terminal;
    a SCR having an anode and a cathode, the anode coupled to the second output terminal and the cathode coupled to the first output terminal;

b) coupling the first power terminal and the second power terminal across an alternating current voltage source having an input voltage; and
  c) controlling the SCR with a control circuit to allow the flow of electricity through the SCR to the charging capacitor during a negative half of an AC cycle of the alternating current voltage source,
  wherein flow of electricity through the SCR during the positive half of the AC cycle is restricted such that the charging capacitor discharges into the storage capacitor.

15. The method of powering a load with a voltage doubling circuit of claim 14, wherein during the negative half of the AC cycle, the alternating current voltage source charges the charging capacitor to a voltage of the alternating current voltage source.

16. The method of powering a load with a voltage doubling circuit of claim 15, wherein a voltage of the storage capacitor is regulated by during a negative half of the AC cycle, the control circuit configures the SCR to allow or restrict the flow of electricity from the charging capacitor to charge the storage capacitor to a predetermined voltage during the positive half of the AC cycle.

17. The method of powering a load with a voltage doubling circuit of claim 14, further including placing a load across the first output terminal and the second output terminal, wherein the load comprises any one of a strobe light, a horticulture luminary light, a pulsed xenon light and a high intensity discharge (HID) light.

18. The method of powering a load with a voltage doubling circuit of claim 14, wherein the storage capacitor is configured to provide power to a strobe light comprising a pulsed xenon light.

* * * * *